Oct. 6, 1970

O. NAGEL ET AL 3,531,915

REMOVING WATER VAPOR FROM CRACKED GASES

Filed Oct. 24, 1968

INVENTORS:
OTTO NAGEL
ROLF PLATZ
KURT TAGLIEBER
KURT WEINFURTER

BY: *Marzall, Johnston, Cook & Root*

ATT'YS 3,531,915
REMOVING WATER VAPOR FROM CRACKED GASES
Otto Nagel, Wachenheim, Rolf Platz, Mannheim, and Kurt Taglieber and Kurt Weinfurter, Ludwigshafen, Germany, assignors to Badische Anilin- & Soda-Fabrik Aktiengesellschaft, Ludwigshafen (Rhine), Germany
Filed Oct. 24, 1968, Ser. No. 770,354
Claims priority, application Germany, Oct. 27, 1967, 1,643,685
Int. Cl. C07c 11/24; B01d 19/00
U.S. Cl. 55—32
7 Claims

ABSTRACT OF THE DISCLOSURE

A process for the removal of water from cracked gases containing acetylene and ethylene by contacting the pre-dried gas with liquid methanol,
(a) removing the main portion of the methanol retained in the gas by cooling;
(b) distilling the condensed methanol together with the liquefied cracked gas to form a $C_2$ top product and a methanol bottoms from which
(c) methanol is extracted with water;
(d) distilling the mixture of methanol and water; and
(e) recycling the regenerated methanol.

---

Figure 1:
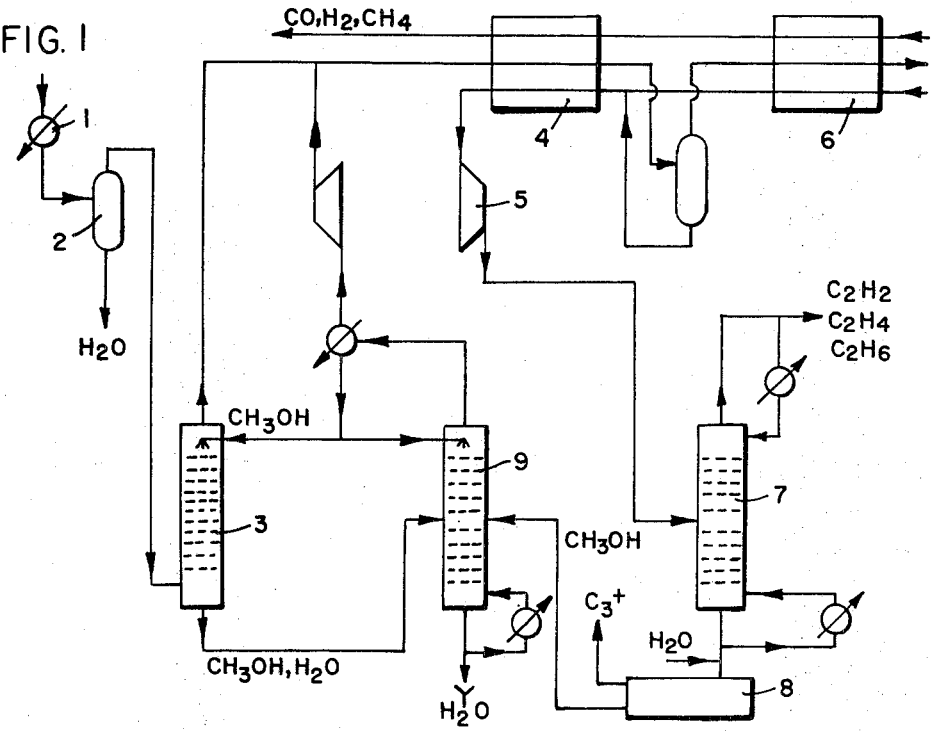

This invention relates to a process for removing water vapor from cracked gas containing acetylene and ethylene by treatment with methanol.

In the thermal cracking of hydrocarbons for the production of acetylene, a cracked gas is formed which contains acetylene, ethylene and higher hydrocarbons. This cracked gas is liquefied so that the condensable constituents such as acetylene, ethylene, propane, $C_3$ hydrocarbons and higher hydrocarbons are separated from the noncondensable constituents such as carbon monoxide and hydrogen. To prevent ice forming in heat exchangers, it is necessary to reduce the water vapor content in the cracked gas down to a few parts per million.

It has already been proposed that cracked gas containing acetylene should be dried by adsorption of water vapor using silica gel, active aluminas or synthetic zeolites. The use of these adsorbents has the disadvantage, however, that gaseous constituents of the cracked gas mixture are also absorbed whose removal is not desired. Since it is necessary to regenerate the adsorbent, usually by means of a hot scavenging gas, periodic changeover of adsorption towers is obligatory.

It is also known that diethylene glycol or triethylene glycol may be used for drying natural gas and petroleum gas and to avoid formation of hydrates. The glycol is injected into the gas in a spraying zone, the water vapor being absorbed by the glycol. The glycol containing water is then separated from the stream of gas and regenerated before it is re-injected.

Depending on the pressure and temperature of the gas, dew point depressions of 50° C. are possible. This dew point depression is not adequate for condensation temperatures of for example −100° C.

The dew point depression which is possible depends on how completely the water has been removed from the diethylene glycol or triethylene glycol in a rectifying column. The bottoms temperature and consequently the permissible pressure are limited owing to the risk of polymerization and decomposition of the glycol. Regeneration therefore has to be carried out at the permissible bottoms temperature at subatmospheric pressure. The available pressure drop permits only a limited number of separation stages by which the necessary important water concentration cannot be achieved.

We have now found surprisingly that water vapor can be removed in a simple way from cracked gas containing acetylene, ethylene and higher hydrocarbons prior to their separation at low temperatures by bringing the gas which has been pre-dried by cooling into contact at atmospheric or superatmospheric pressure with methanol,
(a) Freeing the gas mixture leaving the methanol treatment unit from the major portion of the methanol in a heat exchanger;
(b) Separating the condensate containing methanol (if desired together with the liquefied hydrocarbon mixture freed from inert gas by further cooling) in a rectifying column into an ovehead product consisting substantially (i.e. to an extent of more than 90 mole percent) of $C_2$ hydrocarbons and a bottoms product consisting of hydrocarbons higher than $C_2$ and methanol;
(c) Extracting the methanol from the bottom product with water;
(d) Freeing the resultant mixture of methanol and water from water; and
(e) Returning the regenerated methanol to the methanol treatment unit (a).

One embodiment of the process consists in carrying out the methanol treatment in a scrubber having for example thirty trays from which an already dehydrated gas is withdrawn from the top and a mixture of methanol and water from the bottom of the scrubber. The dehydrated gas is then passed through a heat exchanger which cools the gas to a temperature below the zero point but at most to a temperature which is a few degrees (for example 5° C.) above the solidification temperature of methanol, and which brings about a condensation of the entrained methanol vapor.

According to another embodiment of the invention, a saturator, for example a column having a smaller number of trays, in which the gas is passed countercurrent to the descending trickling methanol, is used for the methanol treatment. An equilibrium concentration of water in the mixture of methanol and water to the water vapor content of the cracked gas is set up in the saturator because no liquid mixture of methanol and water is withdrawn from the saturator. Rather the gas mixture which contains methanol and water vapor is passed into a heat exchanger which cools the gas mixture to a temperature below 0° C. down to a maximum of a few degrees (for example 5° C) above the solidification temperature of the mixture of water and methanol. Water does not freeze out in this heat exchanger under these conditions. Particularly at the composition 65 mole percent of methanol and 35 mole percent of water, methanol forms with water a eutectic lying at −138° C.

Instead of using a saturator, apparatus may be used with which gaseous or liquid methanol is injected into the stream of gas. In this way it is also possible to supply less than the amount of methanol required for saturation and thus to vary the freezing point of the condensed mixture of methanol and water.

Conventional methods may be used for removing the water contained in the methanol, such as passing the mixture of methanol and water over adsorbents or preferably a rectification. The stream of washing agent freed from water contains higher hydrocarbons which, after the methanol has been separated by condensation, are passed together with the gas stream leaving the methanol treatment stage into the heat exchanger which cools the gas mixture to below 0° C.

Figure 2:
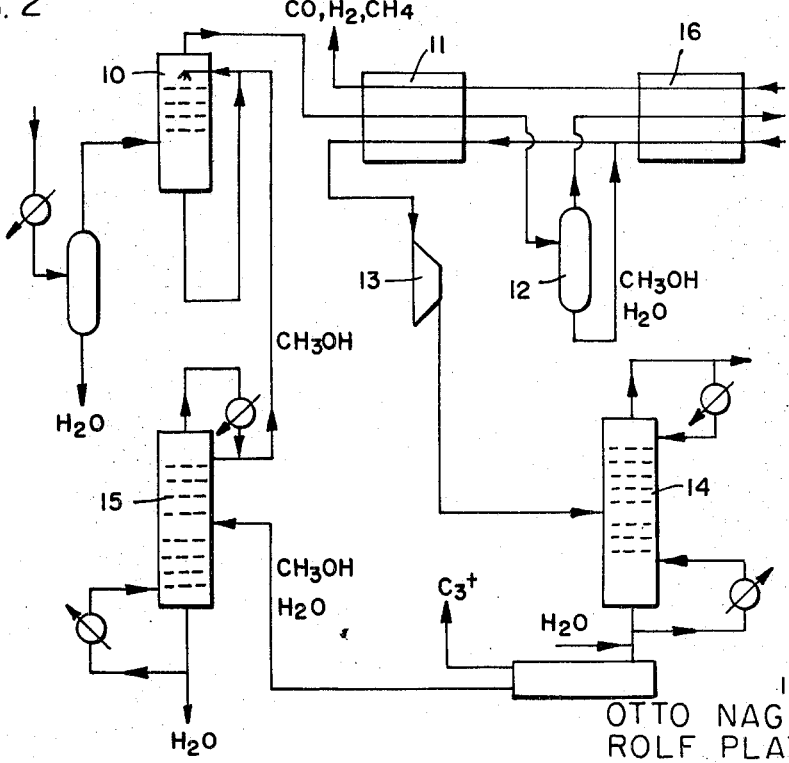

The process according to this invention will now be described in detail by way of example with reference to the drawings. FIGS. 1 and 2 illustrate two embodiments of the invention.

Referring to FIG. 1, a cracked gas having the components: hydrogen, carbon monoxide, methane, acetylene, ethylene and higher hydrocarbons is cooled to $+5°$ to $+10°$ C. at about 8 to 14 atmospheres absolute in a heat exchanger 1 and pre-dried by separating the major portion of the water in a separator 2. The cracked gas is then washed with methanol in a scrubber 3 and the water vapor content is brought down to less than 10 molar p.p.m. Entrained methanol amounting to about 1 mole percent is condensed in a heat exchanger 4 by cooling to about $-20°$ C. and, together with the condensate formed in the heat exchanger, is separated in a rectifying column 7 after re-evaporation and compression to for example 16 to 20 atmospheres absolute.

A mixture of 93 mole percent of $C_2$ hydrocarbons and 7 mole percent of methane and carbon monoxide is withdrawn at the top. The bottoms product consists of a mixture of 8.7 mole percent of methanol and 91.3 mole percent of higher hydrocarbons. To separate the methanol from these hydrocarbons, water is added and in a separation vessel 8 a mixture of 16 mole percent of methanol and 84 mole percent of water is separated at room temperature and is supplied together with the bottoms product containing water from the scrubber 3 to a rectifying column 9. An overhead product is withdrawn from this column which consists of methanol and higher hydrocarbons which, after condensation and return of methanol to the scrubber 3, is united with the cracked gas leaving the scrubber. The water content in the regenerated methanol is 50 molar p.p.m.

According to another embodiment of the process according to the invention (FIG. 2) a saturator 10 is used for the methanol treatment. A gas mixture containing water vapor and methanol vapor which leaves the saturator 10 has separated from it in a heat exchanger 11 at about $-20°$ C. by condensation a mixture of methanol and water which still contains $C_2$ hydrocarbons; this mixture is collected in a separating container 12 and passed through the heat exchanger 11 and a compressor 13 into a rectifying column 14. Methanol is extracted from the bottoms product from this column by adding water and the resultant mixture of 16 mole percent of methanol and 84 mole percent of water is supplied to a regeneration column 15.

In both variants of the process according to this invention the cracked gas is cooled in a further heat exchanger 16 to a temperature of about $-100°$ C. Since, after having left the heat exchanger 11, 500 molar p.p.m. of methanol and 10 molar p.p.m. of water remain in the cracked gas and since methanol becomes solid at $-97°$ C., it would have been expected that solid methanol would separate out in the heat exchanger 16 and would gradually clog this heat exchanger. Surprisingly this is not the case.

With the process according to this invention it is therefore possible to remove water vapor contained in the cracked gas effectively and economically.

The process according to this invention is particularly suitable for drying cracked gas obtained by the method known as the submerged flame process or by similar methods.

We claim:
1. A process for the removal of water vapor from cracked gas containing acetylene, ethylene and higher hydrocarbons prior to the separation of the acetylene and ethylene at low temperatures which comprises contacting the cracked gas with methanol and
    (a) removing the major portion of the methanol from the gas leaving the methanol treatment unit by cooling it in a heat exchanger;
    (b) passing the condensate containing methanol into a rectifying column in which are separated an overhead product which consists essentially of $C_2$ hydrocarbons and a bottoms product which consists of higher than $C_2$ hydrocarbons and methanol;
    (c) extracting methanol from the bottoms product with water;
    (d) removing water from the mixture of water and methanol thus obtained; and
    (e) recycling the regenerated methanol to the methanol treatment of the cracked gas.

2. A process as claimed in claim 1 wherein the cracked gas is pre-dried by cooling prior to the methanol treatment.

3. A process as claimed in claim 1 wherein the condensate containing methanol in step (b) is combined with the liquefied hydrocarbon mixture which has been freed by cooling from inert gas and the combined streams are distilled in the rectifying column to form the overhead product and the bottoms product.

4. A process as claimed in claim 1 wherein the treatment of the cracked gas with methanol is carried out in a scrubber.

5. A process as claimed in claim 1 wherein the treatment of the cracked gas with methanol is carried out in a saturator.

6. A process as claimed in claim 1 wherein removal of water from the mixture of methanol and water in step (d) is carried out by distilling the mixture in a rectifying column.

7. A process as claimed in claim 1 wherein the gaseous hydrocarbons which are liberated in the methanol regeneration step (d) are recycled to the cracked gas stream ahead of the methanol treatment unit.

References Cited

UNITED STATES PATENTS

| | | | |
|---|---|---|---|
| 2,324,955 | 7/1943 | Rupp et al. | 196—95 |
| 2,894,602 | 7/1959 | Fauser | 183—120 |
| 2,738,859 | 3/1956 | Bartholomé et al. | 183—115 |
| 2,738,860 | 3/1956 | Lorenz et al. | 183—115 |
| 2,891,633 | 6/1959 | Morro et al. | 183—115 |
| 3,330,124 | 7/1967 | Marshall | 62—20 |

FOREIGN PATENTS 621,865   6/1961   Canada.

DELBERT E. GANTZ, Primary Examiner

J. M. NELSON, Assistant Examiner

U.S. Cl. X.R.

55—64; 260—679, 683